United States Patent [19]

LoPresti

[11] 4,018,437
[45] Apr. 19, 1977

[54] MULTIPOSITIONABLE PORTABLE AND COLLAPSIBLE RECTANGULAR FRAME EXERCISING APPARATUS WITH DETACHABLE SUPPORT MEANS

[75] Inventor: Roy F. LoPresti, Chicago, Ill.
[73] Assignee: Samuel Peskin, Gaithersburg, Md.
[22] Filed: Nov. 3, 1975
[21] Appl. No.: 627,855

Related U.S. Application Data

[62] Division of Ser. No. 567,370, April 11, 1975, Pat. No. 3,944,219.

[52] U.S. Cl. .................. 272/62; 403/205; 403/382; 403/403; 248/161; 272/112
[51] Int. Cl.² .......................... A63B 1/00
[58] Field of Search ........... 272/62, 60, 67, 57 R, 272/109, 112–113, 93

[56] References Cited

UNITED STATES PATENTS

| | | | |
|---|---|---|---|
| 1,168,361 | 1/1916 | Wilson | 272/62 |
| 2,474,060 | 6/1949 | Mosher | 272/62 |
| 2,716,027 | 8/1955 | Gehri | 272/83 R |
| 3,430,953 | 3/1969 | Teetor | 272/62 |
| 3,501,140 | 3/1970 | Eichorn | 272/62 X |
| 3,601,397 | 8/1971 | Carlin | 272/62 |
| 3,716,232 | 2/1973 | Johnson et al. | 272/62 X |

FOREIGN PATENTS OR APPLICATIONS 628,340  8/1949  United Kingdom ............. 272/82

Primary Examiner—Harland S. Skogquist
Assistant Examiner—William R. Browne
Attorney, Agent, or Firm—McCaleb, Lucas & Brugman

[57] ABSTRACT

Exercising apparatus having a frame made of detachably, telescopically coupled tubular members. Connected to the top most cross member of the frame is a substantially rigid spring member that extends between and removably connects the frame with a door. The substantially rigid spring member includes two parallel spaced arms. At the opposite end of the member are two longitudinally spaced elements that engage respectively the front surface of a door, the top of the door and the upper back surface of a door. With the substantially rigid spring member in place for use by an exerciser the frame will be spaced from the top of the door.

6 Claims, 16 Drawing Figures

DOOR-STABILIZED
FLOOR SUPPORTED VERSION

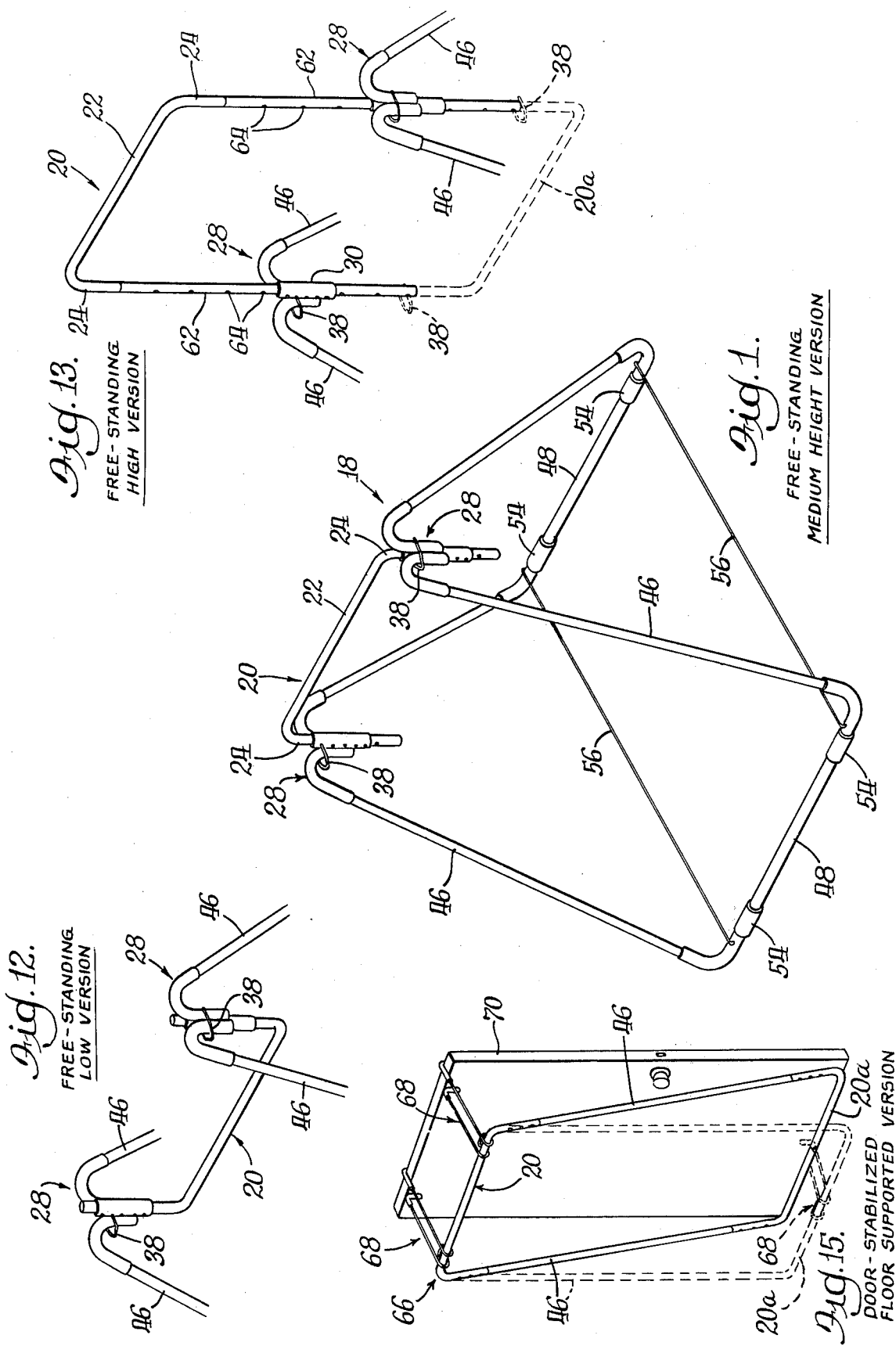

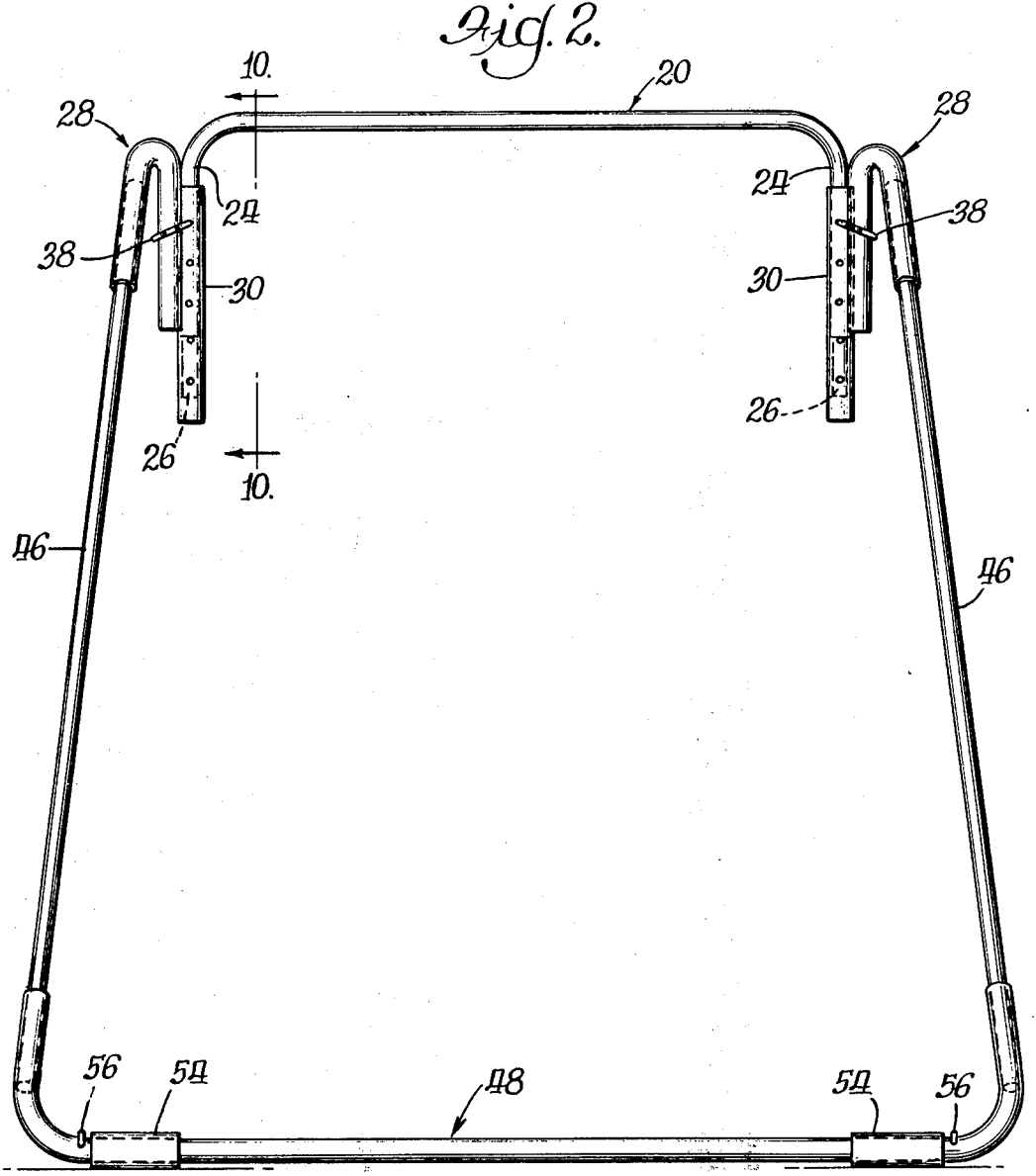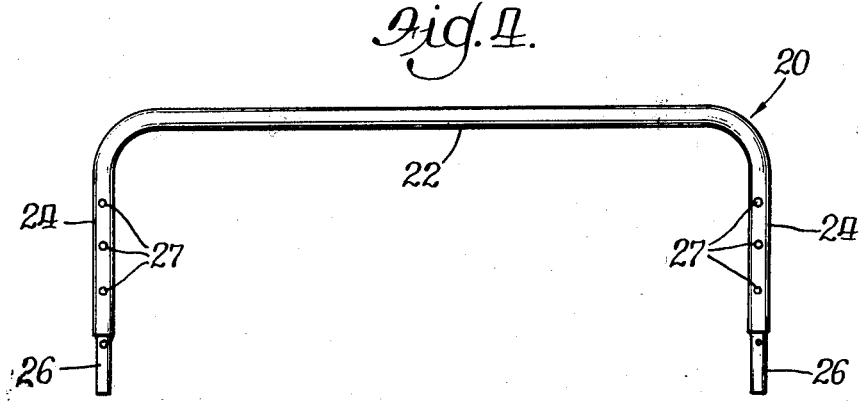

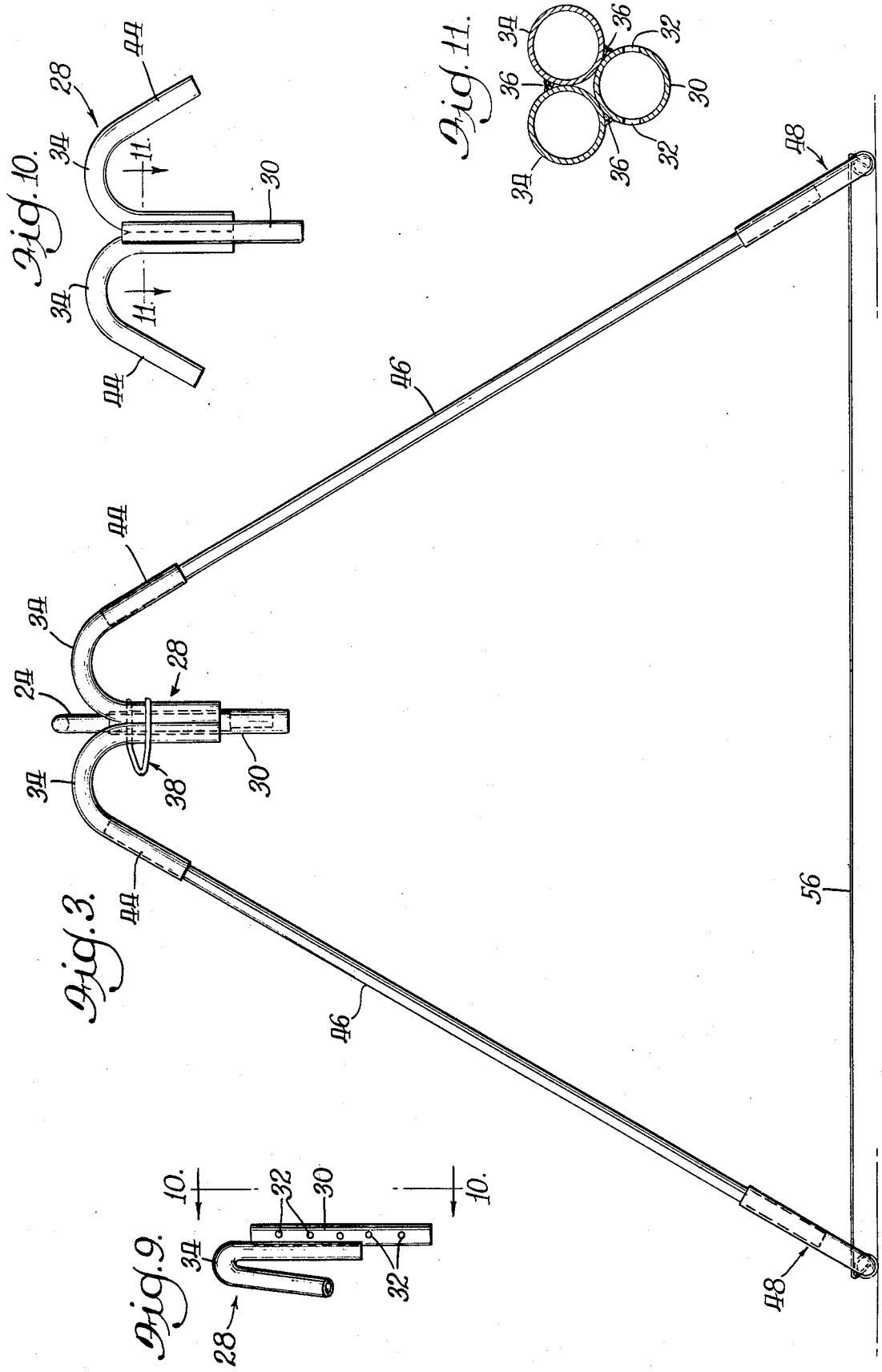

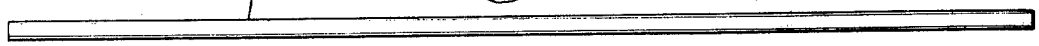
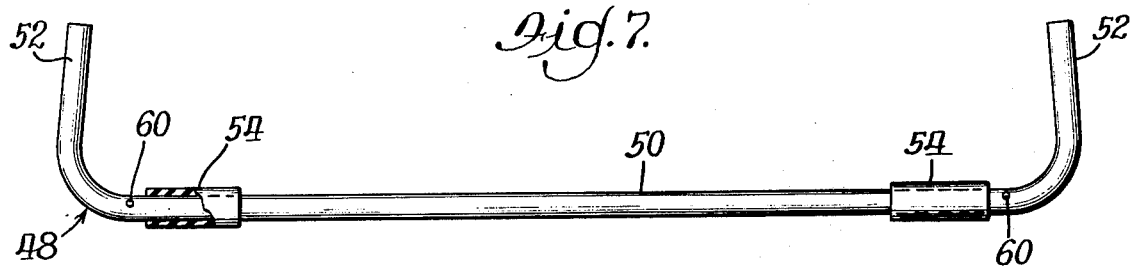
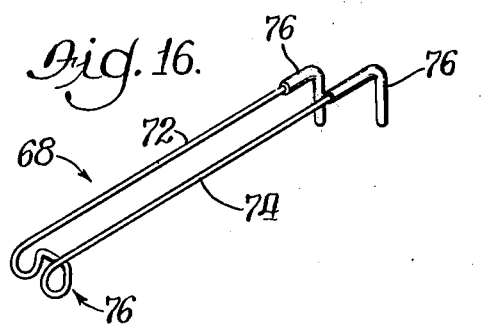
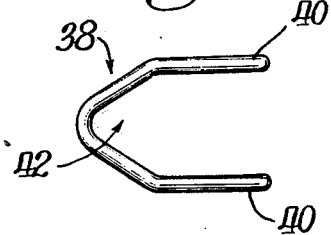
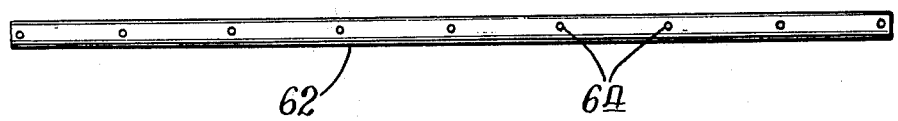

MULTIPOSITIONABLE PORTABLE AND COLLAPSIBLE RECTANGULAR FRAME EXERCISING APPARATUS WITH DETACHABLE SUPPORT MEANS This application is a divisional of Serial No. 567,370, filed April 11, 1975, now U.S. Pat. No. 3,944,219

BACKGROUND OF THE INVENTION

This invention relates generally to gymnastic exercising apparatus which is portable and collapsible and which can be reassembled into a door-stabilized floor-supported exercising device.

A basic gymnastic device is a horizontal bar. This is widely used in homes, schools and institutions because of the benefits of chinning exercises, as well as a variety of other more advanced forms of exercise which can be performed by many people, both men, women, adults, children and even individuals who are partially handicapped.

In most places, whether they be a home, office or a well equipped gymanasium, a horizontal bar exercising apparatus should be sufficiently portable that it can be moved indoors and outdoors from place to place as needed, and it should be collapsible or dismantleable so it can be stored when not in use.

Such horizontal bar exercising apparatus presently available for gymnasiums is quite heavy and expensive. If it is free standing and light enough to be portable, the versions available today are likely to be tipped or displace across the floor by swinging and chinning exercises, particularly by heavy individuals. The versions, which are available for home and office use are mostly bars which are fastened into or over doorways by means of rubber friction pads, or by bolts, screws, or teeth which can mar the door or door frame in one way or another.

Further, these are always subject to dangerous loosening or improper installing and are limited in weight capacity, some not even being recommended for individuals weighing over 200 pounds. A user can be severely injured by a fall if one loosens while he is using it. They are limited in height, rarely being over seven feet high, and where used inside a doorway the usable height is limited by the upper sill.

SUMMARY OF THE INVENTION

With the foregoing in view, the primary object of the present invention is to provide a portable and collapsible exercising apparatus in which the basic components can be assembled into a door-stabilized, floor-supported exercising device.

It is a further object of the invention that the device will be light enough to move even while assembled, strong enough to enable violent exercising maneuvers when supported by a substantially rigid spring member at a selected distance from the top of a door and which can be readily dismantleable into a number of small parts small enough to be stored or carried in a container that can be handled by one person.

A further object is that the door-stablilized, floor-supported device is quickly attachable to a door, whether at the top or bottom, or both, for exercising, and then can be stored as assembled behind the door for ready accessibility. And it can be quickly, readily attached to and detached from a door without marring the door or the door frame in any way, yet providing positive floor support and solid stability without overstressing the door or door hinges, even when used in exercising by heavy, strong individuals.

Another object of the invention is to provide such apparatus which is simply constructed and capable of being manufactured substantially completely of standard, universally available, light weight steel tubing with many individual parts being identical so it can be produced and sold at low cost.

BRIEF DESCRIPTION OF THE DRAWINGS

Other objects and advantages will be apparent from the following description taken in connection with the accompanying drawings in which:

FIG. 1 is a perspective view of an assembly illustrating a free standing medium height version of the invention;

FIG. 2 is a front view of FIG. 1;

FIG. 3 is a side view of FIG. 1;

FIGS. 4, 5, 6, 7, 8 and 9 are individual parts of the assembly shown in FIGS. 1–3, FIG. 9 being a front view of one of the spiders shown in FIG. 2;

FIG. 10 is a side view of one of the spiders as seen in the direction of the arrows 10—10 in FIGS. 2 & 9;

FIG. 11 is a cross sectional view of FIG. 10 taken along the line 11—11;

FIG. 12 is a fragmentary perspective view of the FIG. 1 assembly illustrating a free standing low version of the invention resulting from inverting the cross bar shown in the FIG. 1 assembly;

FIG. 13 is another fragmentary perspective view similar to FIG. 1 illustrating a free standing high version of the invention resulting from adding a pair of vertical extensions to the FIG. 1 assembly;

FIG. 14 is an individual view of one of the extension tubes shown in FIG. 13;

FIG. 15 is a perspective view of a door-stablilized, floor-supported version comprising a rectangular frame made from some of the components shown in the free standing version and some special spring connecting members; and FIG. 16 is a perspective view of one of the spring connecting members shown in FIG. 15.

Like parts are designated by like reference numerals throughout the figures.

DESCRIPTION OF THE PREFERRED EMBODIMENT

The preferred embodiment is shown assembled in free standing medium height, low, and high versions in FIGS. 1, 12 and 13, respectively. Components shown in FIG. 1 can be rearranged and assembled in a door-stabilized, floor-supported version, with the addition of a pair of special spring attaching members, as shown in FIG. 16.

Referring first to the free standing medium height version shown in FIGS. 1, 2 and 3, there is an open frame generally designated 18 made mostly of light weight steel tubing. A U-shaped tubular exercising cross bar 20 is shown individually and in detail IN FIG. 4. It has a horizontal center section 22 extending from side to side of the frame and it has vertical, depending end sections 24, 24. Each of the latter includes an integral, reduced diameter, coupling extension 26, the purpose of which will be explained later.

Pairs of diametrically aligned apertures 27 are provided in the vertical end sections 24.

A spider supporting member 28 is provided on each side of the frame. Details of the spider member are shown in FIGS. 9, 10 and 11. Briefly, each comprises a vertical tube 30 having in this particular case five pairs of aligned apertures 32 diametrically opposed. A pair of curved, C-shaped tubes 34 are attached integral with each tube 30 by welding in three areas indicated by the numeral 36 in FIG. 11. The outer or free end of each of the curved tube sections 34 of the spiders extend downward and they diverge uniformly toward the front and back as shown in FIG. 3. In addition, these outer or free ends of the two sections 34 diverge slightly outwardly, sidewise, as shown in FIG. 2.

The cross bar 20 is telescopically and detachably coupled to the spider members. This is provided by the construction wherein the inside diameters of the vertical tubes 30 are slightly larger than the outside diameters of the vertical end sections 24 of the cross bar. Providing a sliding fit. By adjusting the height of the cross bar unitl a pair of apertures 27 registers with a pair of apertures 32, and inserting one leg of a C-shaped pin 38 therethough, the cross bar can be locked at a selected usable height. The pin 38 is shown in some detail in FIG. 8 and comprises simply a rod bent as shown to provide a pair of legs 40 with a bight 42 providing a convenient place to grasp the pin when the cross bar is to be unlocked.

Each pair of downwardly diverging tube portions 44 of each spider are telescopically and detachably coupled to the top ends of a pair of downwardly diverging tubular legs 46 at each side of the frame. These legs 46 are simple straight lengths of tubing with outside diameters sufficiently less than the inside diameters of the tubes 44 to enable a telescopical and detachable slip fit coupling.

A pair of U-shaped tubular feet 48 are at the front and rear of the frame. Each foot has a hoizontal center section 50 for providing floor support and extending from side to side of the frame. Each has upstanding end sections 52 with inside diameters slightly greater than the outside diameters of the bottom ends of the legs 46. This, again, enables a detachable telescopical slip fit coupling for ready assembly and disassembly. Details of one of the feet 48 is shown in FIG. 7 including a pair of rubber-like sleeves 54 fitted over the outside to prevent the apparatus from slipping or scooting on the floor when in use.

A pair of tension rods 56, shown in detail in FIG. 6, have hooked end portions 58 engaged within apertures 60 in the front and back feet, respectively. These tension rods are subjected only to tensile loads and therefore may be relatively small in cross section. Despite their size, they contribute very substantially to stability of the frame by preventing outward movement of the feet, and spreading of the legs, and "walking" of the frame due to repeated vertical loads on the cross bar.

The medium height version just described in connection with FIGS. 1, 2 and 3, may be converted to a low version, for small children or for waist-high horizontal bar exercises, by simply inverting the cross bar as shown in FIG. 12.

The version of FIG. 1 may be converted to a high version, 8' high or more, as shown in FIG. 13, by removing the pin 38 and cross bar 20, then fitting extension tubes 62 within the vertical tubes 30. One of the extension tubes is shown in detail in FIG. 14. It consists simply of a straight length of tubing with an outside diameter sufficiently less than the inside diameter of the vertical tubes 30 to provide a slip fit. A pair of apertures 64 will be registered with a pair of apertures 32 in each of the vertical tubes and locked in place by the pins 38. The reduced diameter coupling extensions 26 at the ends of the cross bar 20 have outside diameters slightly less than the inside diameters of the extension tubes 62, enabling a slip fit of substantial axial length which will not come apart in use but does provide a coupling which is detachable when required. Another cross bar 20a, identical to 20, may be held across the bottoms of tubes 62 by another pair of pins 38, as shown in broken lines in FIG. 13 to provide a complete vertical rectangular frame for additional exercises.

The door-stabilized, floor-supported version in FIG. 15 will now be described.

By making the width of the cross bar 20 approximately that of an ordinary doorway (plus or minus up to about 10") and by making the vertical end sections 24 of such length that two of them plus one of the legs 40 have a combined length equal to the height of a door or slightly less, the version of FIG. 15 can be made simply by combining some of the components already described, and adding two connecting members for the top of the door.

Specifically, referring to FIG. 15, a rectangular frame generally designated 66 consists of spaced vertical tubular side members which are two of the legs 46; an upper member which is the exercising cross bar 20 and a lower member designated 20a which is an identical counterpart of the cross bar 20 and may either be kept on hand as a spare or used as a bottom member as shown in broken lines in FIG. 13.

To make the above described parts fit in the closed rectangular frame as shown, it will be understood that the outer diameters of the coupling extensions 26 on the cross bars 20 and 20a will be slightly smaller than the inner diameters of the legs 46.

A pair of spring connecting members 68 connect the upper part of the frame 66 to the upper part of a door 50 which may be a regular door mounted on hinges (not shown) in a home or office. One of these spring connecting members is shown in FIG. 16. It is made of steel rod, preferably some grade of light spring steel, and is formed with a pair of straight parallel arms 72 and 74 joined in a curved, looped terminal portion 76 formed with an opening large enough to slip over the cross bar 20 as shown in FIG. 15. Arm 72 is shorter and engages the front face of the door, functioning as a compression member preventing displacement of the cross bar 20 toward the door. Conversely, arm 74 is longer and it engages the back face of the door, functioning as a tension member presenting movement of the cross bar away from the door. Rubber sleeves 76 are provided on the hooked ends of the spring connecting members to prevent marring the door. The bottom cross bar 20a will be crowded into the horizontal corner defined by the door and the floor. With this arrangement a very heavy man can perform chinning exercises on the upper cross bar 20 in absolute safety both to himself and to the door. Due to the angle of the rectangular frame, the great majority of his weight is directed into the floor and there will be minimal stress applied to the hinges.

Alternatively, the rectangular frame 66 may be held vertically upright by a third member 68 connected to the bottom of the door as shown in broken lines in FIG. 15.

The version of FIG. 15 is so light weight and compact, and so easy to place on a door and remove it, that it can readily be stored behind a door on which it is used and it is entirely practical for an executive who normally gets little exercise to have one of these units in his office and exercise regularly on it, storing it behind the door when not in use.

To make the apparatus compact for storage and shipment, the tension rods 56 may have some alternate form, such as two pieces screwed together in the middle (not shown) or they may be substituted by other suitable tension members. In actual practice in one commercial embodiment of this invention, the longest single component (the feet 48) is only 54 inches long yet it can be assembled into the free standing high version shown in FIG. 13 with the cross bar almost 9 feet above the floor and be perfectly stable during exercising by a heavy individual.

The invention may be embodied in other specific forms without departing from the spirit or essential characteristics of it. The present versions are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. A door-stablized, floor supported horizontal bar exercising apparatus comprising a closed rectangular frame having approximately the dimensions of a door and consisting of spaced vertical tubular side members and spaced horizontal top and bottom tubular cross members, substantially rigid means for releasably attaching the frame to a door, said substantially rigid means comprising, at least one substantially rigid member having means at one end for detachably connecting the substantially rigid means to the top tubular cross member, and said substantially rigid means at its opposite end for detachably connecting it directly to the upper marginal edge portion of a door, said means at the opposite end of said substantially rigid means including means respectively engageable with opposite sides of a door to maintain the top tubular cross member at a selected distance therefrom and to prevent transverse movement of said cross member a relative to a door, while supporting said bottom tubular cross member on a floor adjacent a door, and to enable said top tubular cross member to be used for gymnastic exercising upon attachment of the frame to a door.

2. Apparatus according to claim 1 in which said tubular members are telescopically and detachably coupled to each other adjacent the corners of said frame to make said frame readily portable and storable.

3. Apparatus according to claim 1 in which said means at said one end is pivotally mountable on said top tubular cross member and the substantially rigid means respectively engageable with front and back surfaces of a door and comprises a pair of longitudinally spaced elements extending vertically from said substantially rigid means.

4. Apparatus according to claim 3 wherein said substantially rigid menas comprises a pair of parallel spaced arms connected at said one end by at least one open loop for receiving the top tubular cross member, the free end of one arm of said pair of parallel arms having a vertically extending element and being of a length to permit the element to abut a surface of the door closest to the top tubular cross member, the other arm of said pair of parallel arms being of greater length than said one arm and having a depending element at its free end for engaging the opposite surface of a door when supported on a top edge of a door.

5. Apparatus acording to claim 1 in which said bottom tubular cross member is crowded into a horizontal corner between a door and a floor.

6. Apparatus according to claim 1 including at least an additional substantially rigid means for detachable connection at one end to the bottom tubular cross member for detachable connection at its other end to the lower marginal edge portion of a door and said additional substantially rigid means including means for maintaining said bottom cross member at a spaced distance from the door and against transverse movement relative thereto.

* * * * *

UNITED STATES PATENT OFFICE
CERTIFICATE OF CORRECTION

Patent No. 4,018,437     Dated April 19, 1977

Inventor(s) Roy F. LoPresti

It is certified that error appears in the above-identified patent and that said Letters Patent are hereby corrected as shown below:

Col. 3 lines 18 and 19 change "bar. Providing" to --bar. providing--

Col. 3 line 20 change "unitl" to --until--

Col. 5 line 41 change "rigid means at its" to --rigid means having means at its--

Col. 6 line 4 delete "a"

Col. 6 line 16 change "means respectively" to --means is respectively--

Col. 6 line 21 change "menas" to --means--

Col. 6 line 26 change "the" (2nd occurrence) to --a--

Col. 6 line 32 change "acording" to --according--

Signed and Sealed this

Twelfth Day of September 1978

[SEAL]

Attest:

RUTH C. MASON
*Attesting Officer*

DONALD W. BANNER
*Commissioner of Patents and Trademarks*